United States Patent [19]
Bridgelall et al.

[11] Patent Number: 5,449,893
[45] Date of Patent: Sep. 12, 1995

[54] DIGITIZER FOR BAR CODE READER

[75] Inventors: Raj Bridgelall, Mt. Sinai; David P. Goren, Ronkonkoma, both of N.Y.

[73] Assignee: Symbol Technologies, Inc., Bohemia, N.Y.

[21] Appl. No.: 347,597

[22] Filed: Nov. 30, 1994

Related U.S. Application Data

[63] Continuation of Ser. No. 153,638, Nov. 17, 1993, abandoned, which is a continuation-in-part of Ser. No. 862,471, Apr. 2, 1992, Pat. No. 5,302,813.

[51] Int. Cl.⁶ ............................................. G06K 7/10
[52] U.S. Cl. ................................................ 235/462
[58] Field of Search ............... 235/462, 463, 467, 472; 382/18; 375/1

[56] References Cited

U.S. PATENT DOCUMENTS

| | | | |
|---|---|---|---|
| 3,798,458 | 3/1974 | Buckingham et al. | 235/463 |
| 3,932,840 | 1/1976 | Hanchett | 235/463 |
| 4,184,179 | 1/1980 | Demig | 235/463 |
| 4,251,798 | 2/1981 | Swartz et al. | 235/462 |
| 4,354,101 | 10/1982 | Hester et al. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,496,831 | 1/1985 | Swartz et al. | 235/472 |
| 4,500,776 | 2/1985 | Laser | 235/162 |
| 4,740,675 | 4/1988 | Brosnan et al. | 235/462 |
| 4,746,789 | 5/1988 | Gieles et al. | 235/463 |
| 4,758,717 | 7/1988 | Shepard et al. | 235/472 |
| 4,760,248 | 7/1988 | Swartz et al. | 235/472 |
| 4,782,220 | 11/1988 | Shuren | 235/462 |
| 4,798,943 | 1/1989 | Cherry | 235/463 |
| 4,808,804 | 2/1989 | Krichever et al. | 235/462 |
| 4,855,581 | 8/1989 | Mertel et al. | 235/462 |
| 4,859,840 | 8/1989 | Hasegawa et al. | 235/463 |
| 4,896,026 | 1/1990 | Krichever et al. | 235/472 |
| 4,933,538 | 6/1990 | Heiman et al. | 235/462 |

(List continued on next page.)

OTHER PUBLICATIONS

Ehrich et al., "Representation of Random Waveforms by Relational Trees", IEEE Transactions on Computers, vol. C-25, No. 7, pp. 725-736 (Jul. 1976).

Eklundh et al., "Peak Detection Using Difference Operators", IEEE Transactions on Pattern Analysis and Machine Intelligence, vol. PAMI-1, No. 3, pp. 317-325 (Jul. 1979).

Horowitz, "A Syntactic Algorithm for Peak Detection in Waveforms with Applications to Cardiography", Communications of the ACM, vol. 18, No. 5 (May 1975).

Kiryati et al., "Gray Levels Can Improve the Performance of Binary Image Digitizers", CVGIP: Graphical Models and Image Processing, vol. 53, No. 1, pp. 31-39 (Jan. 1991).

(List continued on next page.)

*Primary Examiner*—Raymond A. Nelli
*Attorney, Agent, or Firm*—Fish & Richardson

[57] ABSTRACT

A multi-bit digitizer for a bar code reader for detecting and reading bar code symbols, which are generally printed on a label or on the surface of an article. The multi-bit digitizer detects the presence of edges of a scanned bar code symbol, and also measures the strength of each detected edge therein. During a scanning operation, a sensor senses light reflected from a bar code symbol and produces an analog scan signal representative thereof. Positive and negative edges in the analog scan signal are detected, and timing signals are developed representative thereof. The strength of each detected edge in the analog scan signal is determined by measuring the pulse-widths of the timing signals. A separate edge-direction signal is also developed which indicates the nature of the edge. The signals are directed as inputs to a decoder which performs multiple threshold processing on each individual analog scan signal by processing each analog scan signal a multiple number of times at different detection threshold levels. The ability to perform multiple thresholding on a single scan is significant for the development of very aggressive wands in which only a single scan is available for processing.

15 Claims, 11 Drawing Sheets

U.S. PATENT DOCUMENTS

| | | | |
|---|---|---|---|
| 4,973,829 | 11/1990 | Ishida et al. | 235/462 |
| 5,010,242 | 4/1991 | Frontino | 235/467 |
| 5,029,183 | 7/1991 | Tymes | 375/1 |
| 5,059,773 | 10/1991 | Shimizu et al. | 235/436 |
| 5,073,954 | 12/1991 | Van Tyne et al. | 382/18 |
| 5,128,527 | 7/1992 | Kawai et al. | 235/462 |
| 5,140,146 | 8/1992 | Metlitsky et al. | 235/462 |

OTHER PUBLICATIONS

Pavlidis, "Algorithms for Shape Analysis of Contours and Waveforms", IEEE Transactions on Pattern Analysis and Machine Intelligence, vol. PAMI-2, No. 4, pp. 301–312 (Jul. 1980).

Pavlidis et al., "Fundamentals of Bar Code Information Theory", Computer, pp. 74–86 (Apr. 1990).

DIGITIZER FOR BAR CODE READER

This is a continuation of application Ser. No. 08/153,638, filed Nov. 17, 1993, now abandoned, which is a continuation-in-part of application Ser. No. 07/862,471, filed Apr. 2, 1992, now issued U.S. Pat. No. 5,302,813.

BACKGROUND OF THE INVENTION

1. Field of the Invention

The present invention relates generally to a digitizer for a bar code reader which detects bar code symbols which are generally printed on a label or on the surface of an article. More particularly, but not exclusively, the subject invention pertains to a digitizer as described which detects the presence of edges in a bar code symbol and also measures the strength of each detected edge.

2. Discussion of the Prior Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article of some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, light beam, at a target and a symbol to be read.

The light source in a laser scanner is typically a gas laser or semiconductor laser. The use of a semiconductor device such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding use, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239 which is hereby incorporated by reference.

A one-dimensional single-line scan, as ordinarily provided by hand-held readers, has disadvantages in reading these two-dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path towards a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

Conventional bar code scanners provide an indication only of the presence or absence of an edge, and not of its strength or relative strength. This has the disadvantage that if the decoder does not decode the input signal to a valid bar code symbol, further attempts to decode require that the symbol be re-scanned, for example at a different distance, in a different direction, or using different threshold values.

Our co-pending US application attempts to alleviate these difficulties by providing a system in which the strengths of the edges are determined and are fed to the decoder prior to decoding commencing. Decoding then takes place using a particular threshold, in software. If decoding is unsuccessful at a particular threshold, the decoding algorithm can be arranged to try again, automatically, using a different threshold without the need to re-scan the symbol. Although the bar code scanner disclosed in this co-pending application is a significant advance on prior art scanners, it does have the disadvantage that additional hardware circuitry is required to determine the edge strengths.

SUMMARY OF THE INVENTION

It is a primary object of the present invention to provide a digitizer for a bar code reader for detecting bar code symbols which detects the presence of an edge of a bar code symbol and also measures the strength of each detected edge.

A further object of the present invention is the provision of a digitizer for a bar code reader which enhances the performance of the bar code reader by defining an improved digital interface, together with appropriate software algorithm routines. Whereas a standard digitizer detects only the presence of an edge, the digitizer of the present invention detects not only the presence of an edge but also measure the strength of the edge. This additional information is passed to a decoder to facilitate multi-threshold processing of a single scan in software algorithm routine. The decoder performs multiple thresholding on a single scan using a minimal number of computations. The ability to perform multiple thresholding on a single scan is significant for the development of very aggressive wands in which only a single scan is available for processing.

The determination of the strength of each detected edge is provided in the present invention by a software routine which measures the relative widths of output timing pulses. This is a cheaper and simpler arrangement than that used in earlier multi-bit digitizers, as described above, which required additional special purpose electronic circuitry to determine edge strength.

In accordance with the teachings herein, the present invention provides a digitizer for a bar code reader in which the sensor senses light reflected from a bar code symbol and produces an analog scan signal representative thereof. Positive and negative edges in the analog scan signal are detected, and timing signals are developed which are representative of those positive and negative edges. The strength of each detected edge in the analog scan signal is determined by comparing the widths of the respective pulses in the timing signal. A separate edge direction signal is also developed, and the timing signal and the edge direction signal are together directed as inputs to a decoder which performs multiple threshold processing on each individual analog scan signal by processing each analog scan signal a number of times at different detection threshold levels.

The software routines make use of the edge direction signal, the timing signal, and the information on the strength of the edges (derived from the widths of the timing signal pulses) to attempt to decode the incoming analog signal as a bar code symbol. The output of the decoder algorithm is then evaluated for the validity of the decoded bar code symbol. If the decoded bar code symbol is not a valid bar code symbol, a different threshold is selected in software, and the process is repeated.

In a preferred embodiment, the sensor, the signal edge detector, and the means for detecting edge direction are all implemented in circuits in hardware, while the decoder (including the routines for determining relative edge strengths) are implemented in software. The signal edge detector includes a first differentiator circuit for taking a first time derivative signal of the analog scan signal, and a second differentiator circuit for taking a second time derivative signal of the analog scan signal. The output of the second differentiator is passed to a window comparator, the output of which actuates a flip flop circuit to produce the timing output signal. The output of the first differentiator is passed to a second window comparator circuit, an output of which is used to actuate a second flip flop circuit to produce an edge direction signal.

BRIEF DESCRIPTION OF THE DRAWINGS

The foregoing objects and advantages of the present invention for a digitizer may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
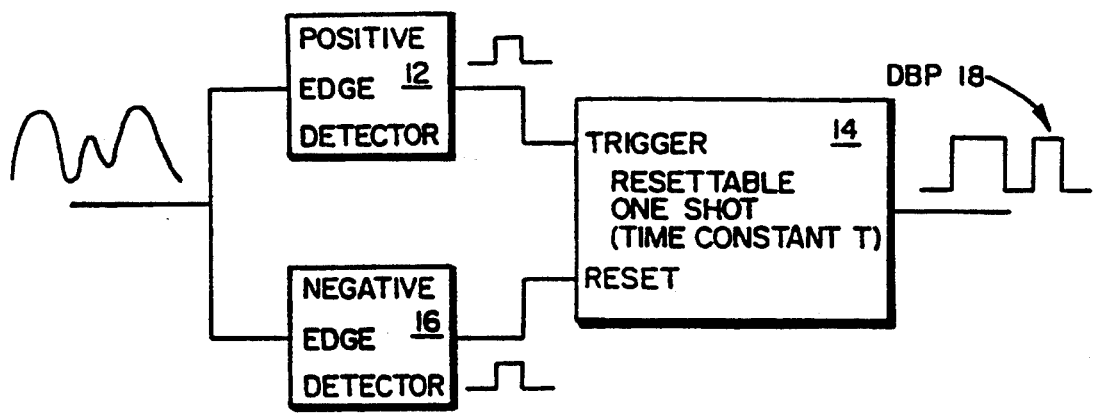
FIG. 1 illustrates a standard prior art digitizer circuit for processing an analog scan signal produced by a bar code detector.

Referring to the drawings in detail, FIG. 1 illustrates a standard prior art digitizer circuit for processing an analog signal produced by a bar code detector. The prior art digitizer circuit includes a positive edge detector circuit 12 which sets a resettable one shot circuit 14 having a time constant T, and a negative edge detector circuit 16 which resets the one shot circuit 14, resulting in a detected bar code pattern (DBP) 18. The advantages of this prior art digitizer circuit are that it presents a relatively simple digital interface to a decoder, and that the interface has become an industry standard. The disadvantages of this prior art digitizer circuit are that all edges are treated equally, the digitizer only responds to the first occurrence of a particular edge type (either positive or negative), and the time constant T is usually fixed and not adaptive.

Figure 2:
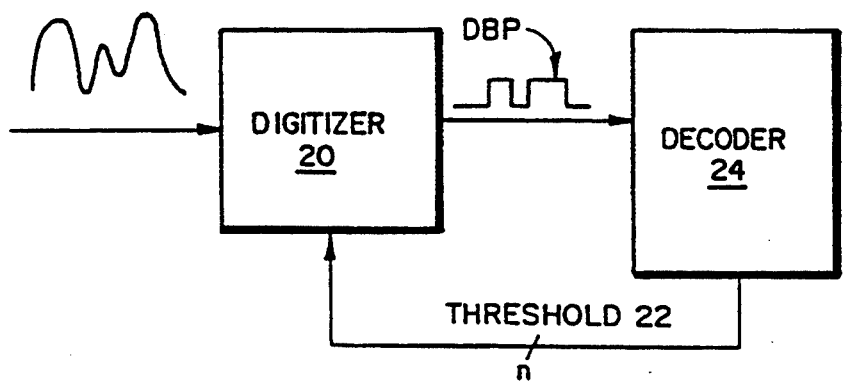
FIG. 2 illustrates a second prior art multiple thresholding digitizer circuit for processing an analog scan signal produced by a bar code detector which selects a detection threshold value based upon previous scan data.

FIG. 2 illustrates a second prior art multi-thresholding digitizer circuit for processing an analog signal produced by a bar code detector in which a digitizer 20 selects a detection threshold value 22 based upon previous scan data, and whether a decoder 24 had produced a valid or invalid detected bar code symbol. An advantage of this circuit is that it requires only slight modifications to a standard decoder interface circuit as illustrated in FIG. 1. The disadvantages of this circuit are that it may need multiple scans to set a proper threshold (not good for aggressive wands), it reduces the effective scan rate if a symbol cannot be read at all threshold levels, and further it is difficult to combine multiple partial scans to form a good scan as it is relatively difficult to synchronize the multiple scans.

Figure 3:
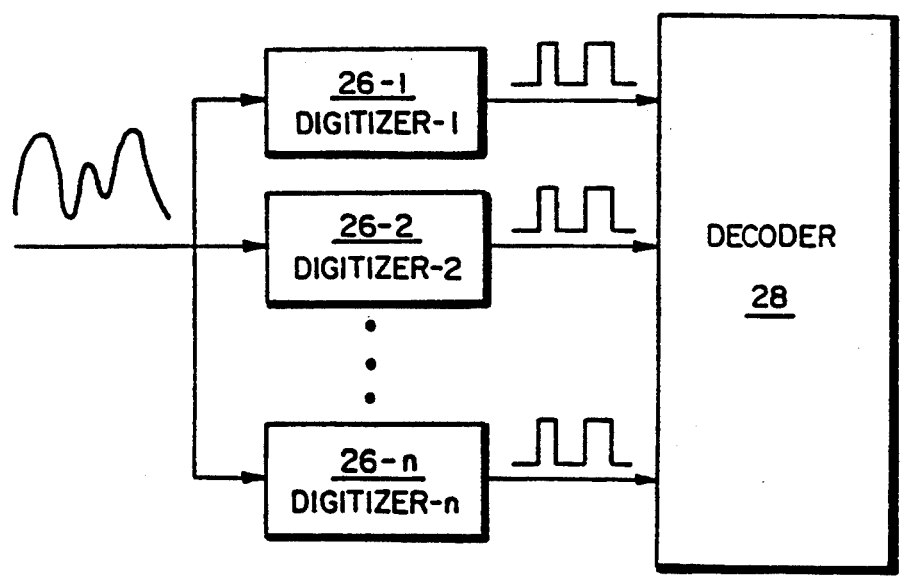
FIG. 3 depicts a third prior art digitizer circuit for processing an analog scan signal produced by a bar code detector which incorporates therein multiple digitizer circuits in parallel, each of which processes the analog scan signal with a different threshold value.

FIG. 3 depicts a third prior art digitizer circuit for processing an analog signal produced by a bar code detector which incorporates therein multiple digitizer circuits 26-1, 26-2, 26-n (as in FIG. 1) arranged in parallel. The advantages of this arrangement are that the multiple parallel digitizer circuits result in multiple attempts to decode from a single scan (good for aggressive wands), and that the synchronization of the digitizer outputs allows partial scan combination. The disadvantages of this arrangement are that it provides a complex interface to the decoder 28, and it is difficult to add more digitizers.

Figure 4:
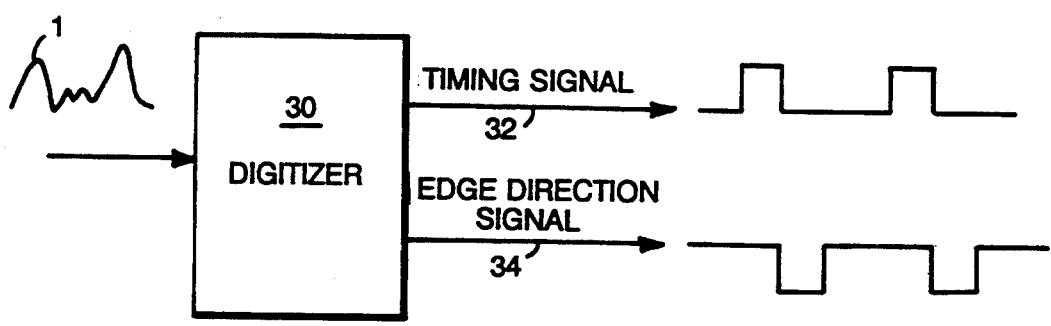
FIG. 4 illustrates a digitizer according to the preferred embodiment of the present invention for processing an analog scan signal produced by a bar code detector which detects the occurrence of edges in the analog scan signal, and also determines the strength of each detected edge and its direction, thereby enabling a decoder to perform multiple threshold processing on a single analog scan signal.

FIG. 4 illustrates a digitizer 30 according to the preferred embodiment of the present invention. The digitizer circuit receives an analog signal 1, and from that signal produces a timing signal 32 for each detected edge, and an edge-direction signal 34. The timing signal 32 and the edge direction signal 34 are passed to a decoder (not shown) which performs multiple threshold processing on a single scan using software routines. The software routines determine the direction of the edge by means of the edge direction signal 34 and the timing (position) of the edge by means of the timing signal 32. The relative strength of successive edges are also determined by the software routines, which make use for that purpose of the relative widths of each respective timing pulse.

The advantages of this arrangements are that the decoder algorithm can attempt many different thresholds on a single scan (excellent for aggressive wands), and also more levels of edge detection can be added without changing the decoder interface dramatically. The disadvantage of this arrangement is that the decoder algorithm has to construct the detected bar code pattern from the timing signals and the digital edge strength signals, thereby increasing the number of computations.

Figure 5:
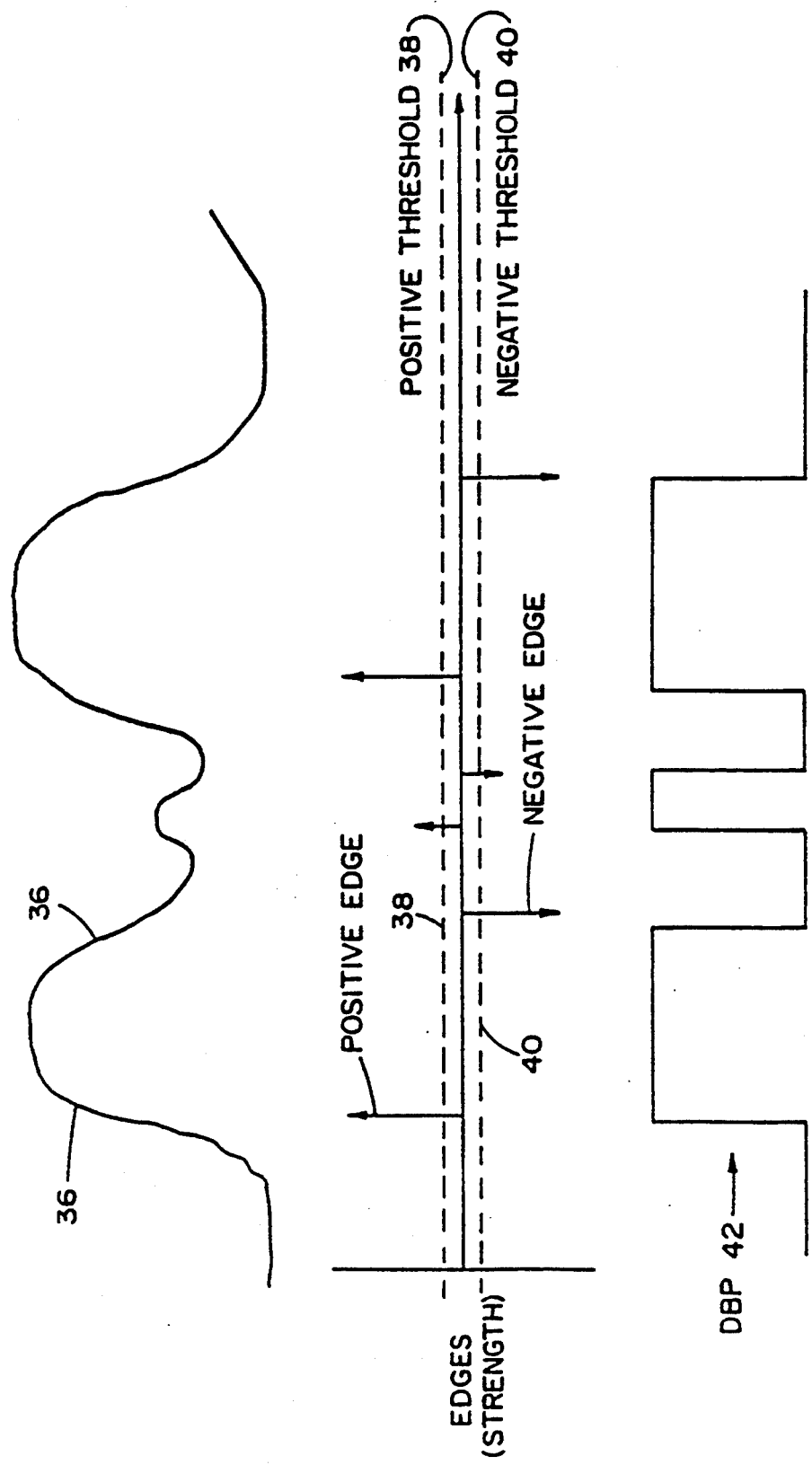
FIGS. 5 and 6 illustrate waveforms and signals useful in explaining the operation of digitizer circuit pursuant to the subject invention in which information on the strength of each detected edge allows software in a decoder to perform multiple threshold processing on a single analog scan signal.
Figure 6:
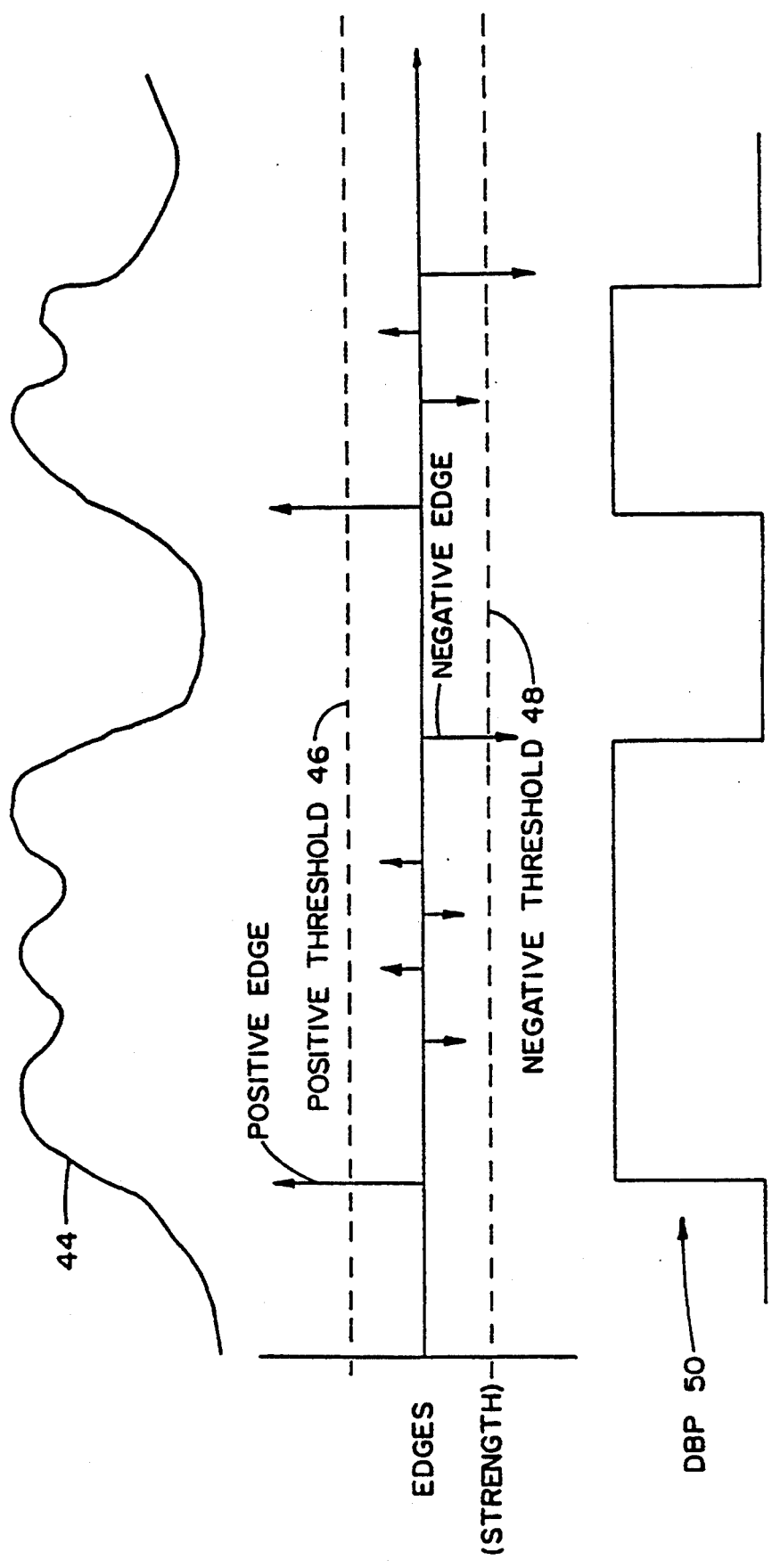

FIGS. 5 and 6 illustrate waveforms and signals useful in explaining the operation of a digitizer circuit pursuant to the present invention. In the example of FIG. 5, an analog detection signal 36 is representative of a high density symbol, and the software positive and negative thresholds 38,40 are set fairly low, resulting in the detected bar code pattern 42 at the bottom of FIG. 5. In the example of FIG. 6, an analog detection signal 44 is representative of a printed dot matrix signal (wherein the edges of the individual dots therein should not be treated as edges of a bar or space), and the software positive and negative thresholds 46,48 are set fairly high, resulting in the detected bar code pattern 50 at the bottom of FIG. 6.

Figure 7:
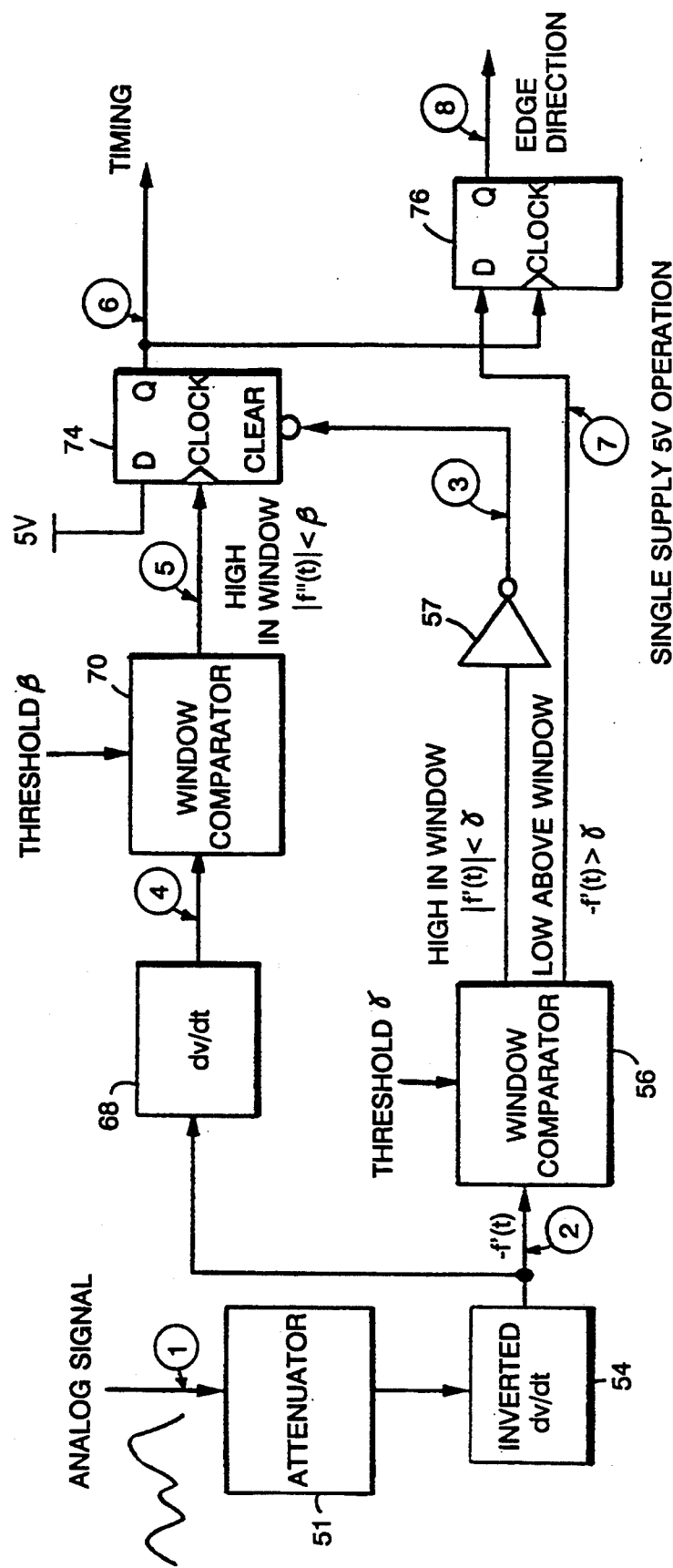
FIG. 7 is a detailed block diagram of an embodiment of a digitizer circuit pursuant to the present invention.
Figure 8:
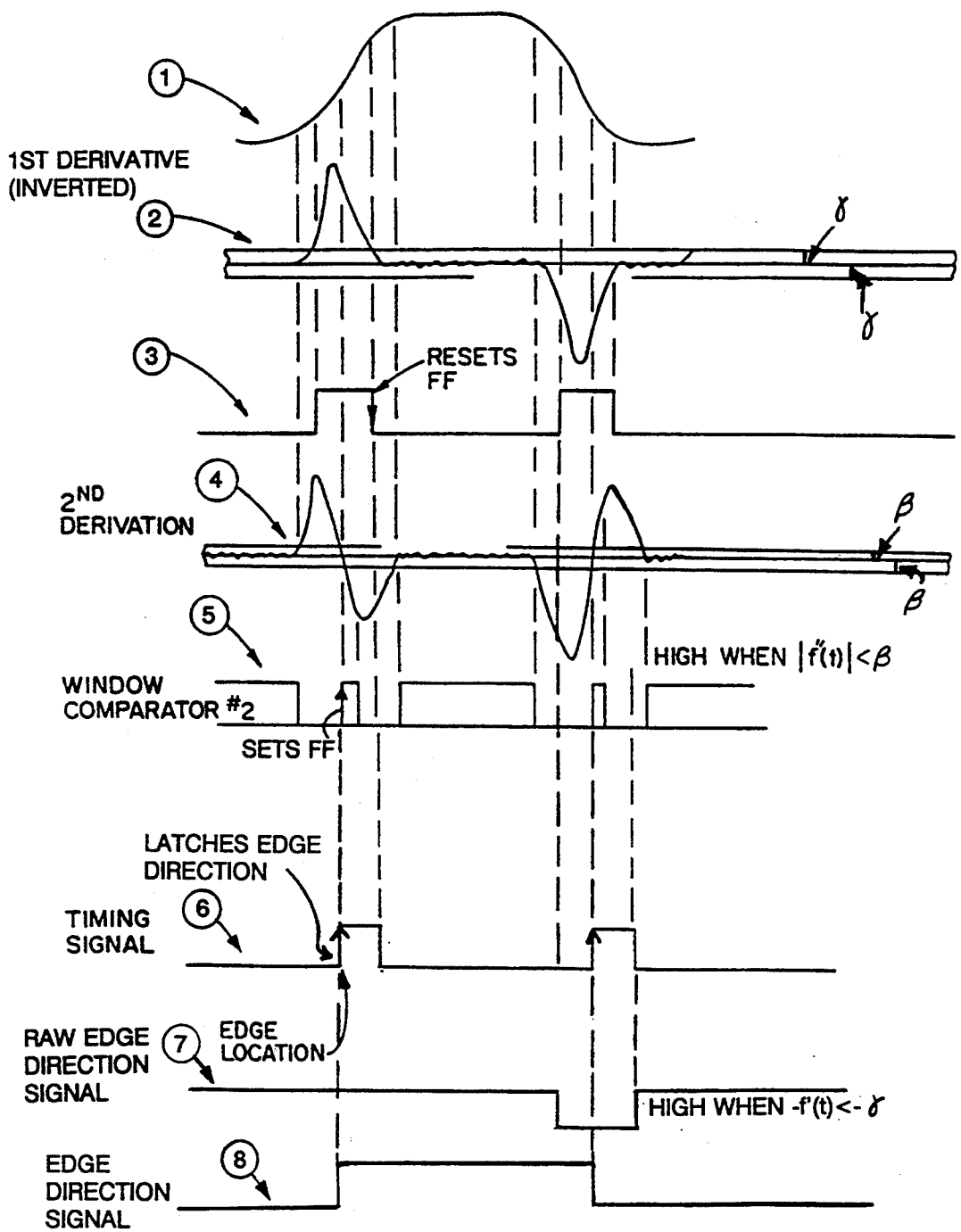
FIG. 8 illustrates exemplary waveforms 1 through 8 which are generated at locations 1 through 8 in and by the digitizer circuit of FIG. 7, which are useful in explaining the operation of the circuit.

FIG. 7 is a detailed block diagram of an embodiment of a digitizer circuit pursuant to the present invention for detecting edges in an analog scan signal and also for measuring the strength of each detected edge. FIGS. 8 illustrates exemplary waveforms 1 through 8 which are generated at locations 1 through 8 in and by the multi-bit digitizer circuit of FIG. 7, which are useful in explaining the operation of the circuit.

In the circuit of FIG. 7, an analog signal f(t) 1 (FIGS. 7 and 8) is directed to an attenuator 51 and then to a first differentiator circuit 54 which develops a first time-inverted derivative signal 2 (FIGS. 7 and 8) of the analog scan signal. The first time derivative signal 2 is directed to a first window comparator circuit 56, which utilizes a threshold 7 to develop a digital signal 3 (FIGS. 7 and 8) after inversion by means of an inverter 57. This is applied to the "clear" input of a flip-flop 74, the purpose of which will be described below.

The first time derivative signal 2 (FIGS. 7 and 8) is also directed as input to a second differentiator circuit 68 which develops a second time derivative signal 4 (FIGS. 7 and 8) which is directed to a second window comparator circuit 70. The circuit 70 utilizes a threshold $\beta$ to develop a digital signal 5, (FIGS. 7 and 8). The digital signal 5 sets the flip flop 74. The flip flop is reset by the signal 3 from the first window comparator 56. As a consequence thereof, the flip flop 74 develops a timing output signal 6, (FIGS. 7 and 8). It will be appreciated that the rising edge of the timing signal occurs at the point where the second derivative signal 4 moves back within the window (of width $2\beta$) of the second window comparator 70. The trailing edge of the timing signal occurs at the point where the first derivative signal 2 moves back within the window (of width $2\gamma$) of the first window comparator 56.

The window comparator 56 also provides an additional signal, a raw edge detection signal 7. This is a logic signal which is low when the inverted-first derivative signal 2 is above the upper edge of the window, and goes high when that signal drops below the upper edge. The signal 7 is supplied to a further flip flop circuit 76 which is latched by means of the positive transition of the timing signal 6. Accordingly, the flip flop circuit 76 provides an edge direction signal 8 (FIG. 7 and 8). A logic high on the edge direction signal 8 indicates a positive-going edge of the input analog signal 1, and a logic low indicates a negative-going edge.

Figure 9:
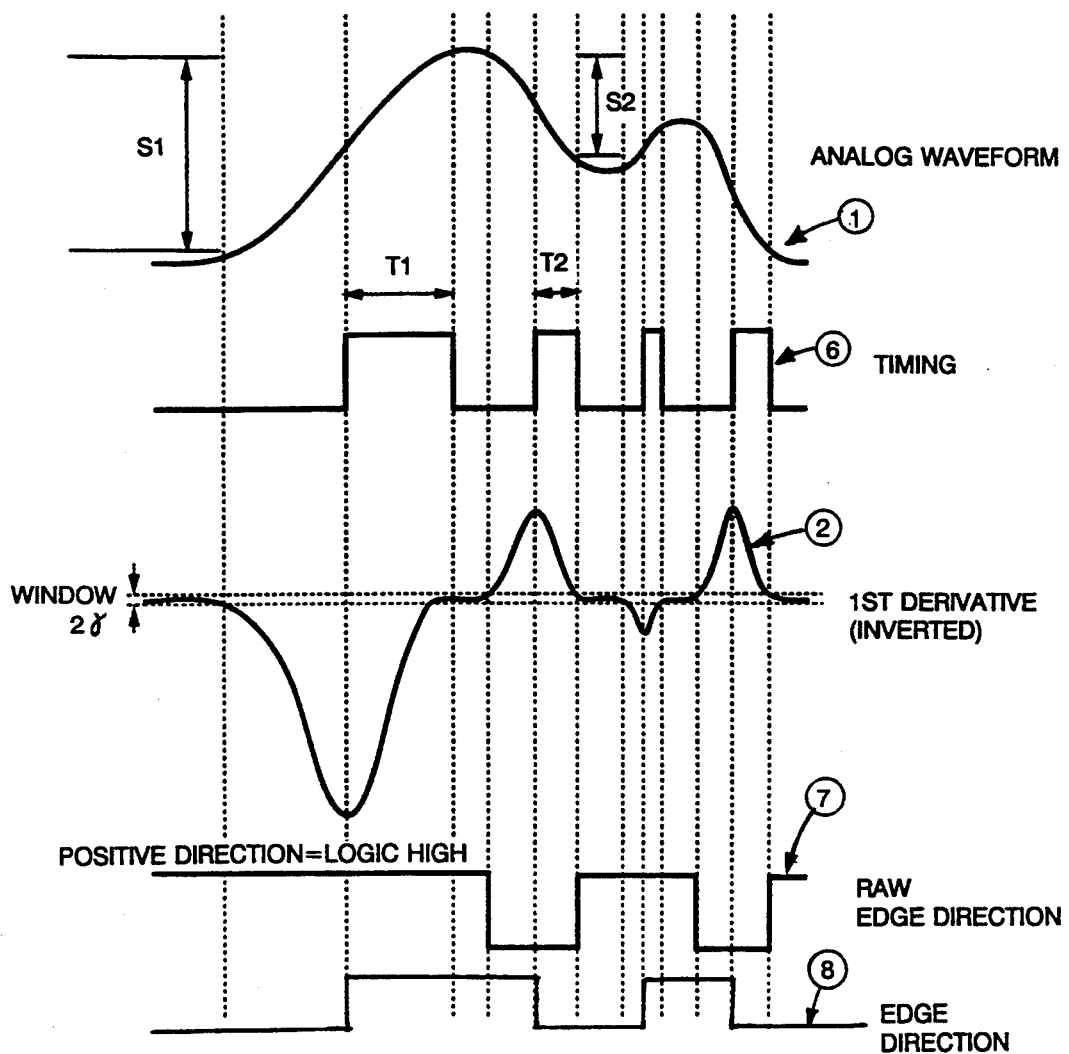
FIG. 9 illustrates some further exemplary waveforms, in particular the timing signal and the edge direction signal.

Reference should now be made to FIG. 9, which presents in simplified form a typical analog input signal 1, along with the corresponding output timing signal 6 and edge direction signal 8. Also shown is the first derivative 2 of the analog waveform 1. It will be seen that the timing signal 6 has four pulses, each corresponding to a separate positive-going or negative-going edge of the analog waveform. The edge direction signal 8 goes low to indicate a negative-going edge.

The timing signal 6 and the edge direction signal 8 are analyzed by a decoder algorithm in a decoder portion (not shown) of the bar code reader. The algorithm needs to determine the relative strength of each positive-going and negative-going edge of the analog waveform, and it does that by considering the relative width of the timing signal pulses. It is found in practice that the width of the timing signal pulses correlate with the relative strength of the corresponding edges. Accordingly, for each edge, the relative widths can be used by the software to determine relative edge strengths. Referring to FIG. 9, let S1 be the strength of the first positive-going edge, and S2 be the strength of the first negative-going edge (in each case measured peak to trough), and T1, T2 be the width of the corresponding timing pulses. It is found in practice that for a given scan the ratios S1/S2 and T1/T2 are similar. This fact is used by the software to calculate the relative strengths of the edges $S_n/S_{n+1}$, based upon the known time ratios $T_n/T_{n+1}$, where n is an edge number.

Measurement of the timing signal pulse widths may be carried out in any convenient way, for example with the use of a conventional counter/timer.

Figure 10:
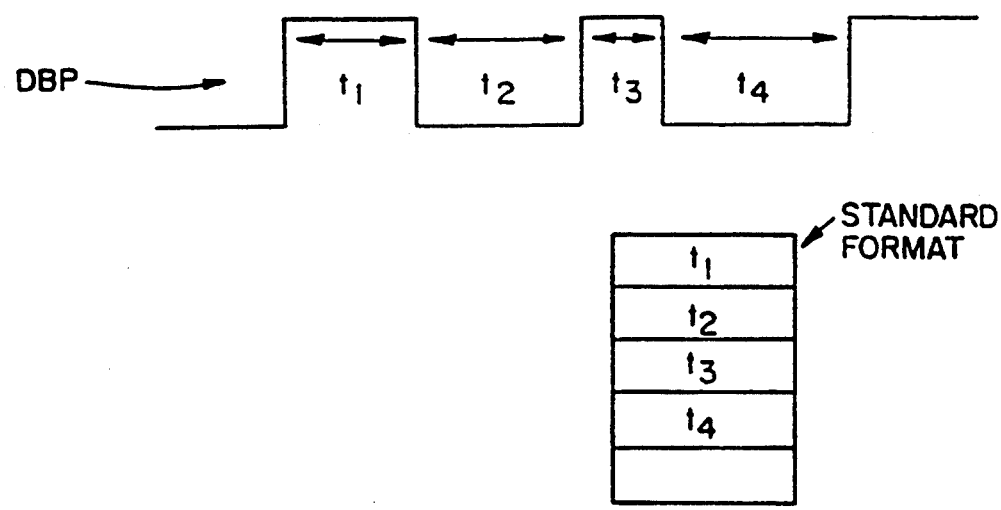
FIGS. 10, 11 and 12 illustrate waveforms and memory formats which are useful in explaining the operation of the present invention.
Figure 11:
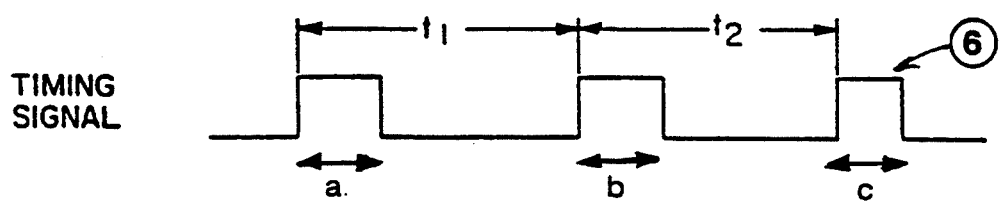
Figure 11:
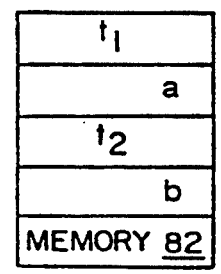
Figure 12:
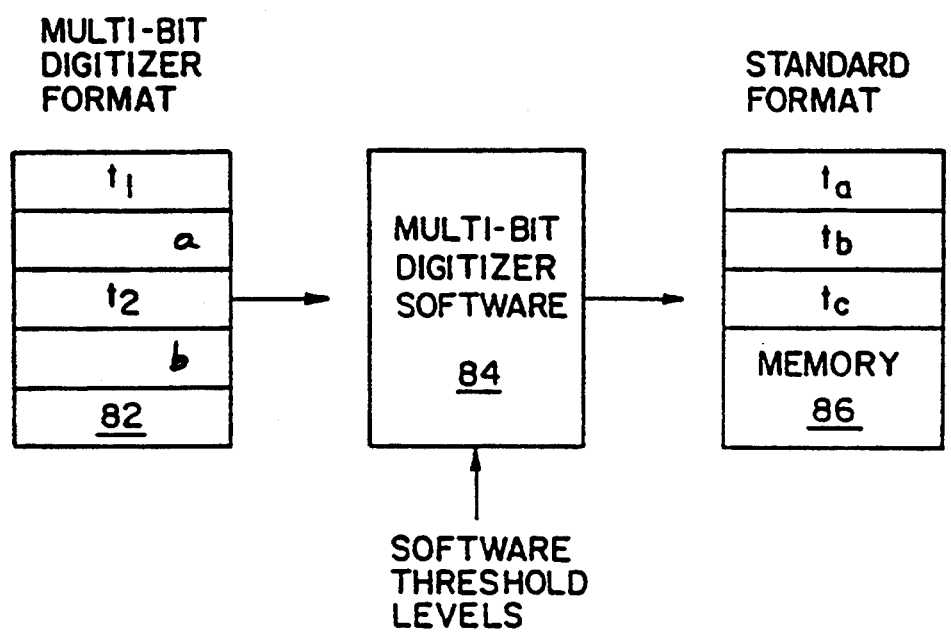

FIGS. 10, 11 and 12 illustrate waveforms and memory formats which are useful in further explaining the way the algorithm might operate.

Referring to FIG. 10, in a standard digitizer such as illustrated in FIG. 1, the detected edges, which can be defined by t1, t3, t4, etc are placed in a memory 80, and a standard decoder algorithm then reads the date on t1, t2, t3, t4, etc from memory and decodes it to a bar code signal.

FIG. 11 illustrates the timing signals t1, t2, etc developed as outputs from the flip flop 74 in the exemplary circuit of FIG. 7, and the edge strength signals d1, d2 which are determined from the widths of the timing signals, as discussed above.

As illustrated in FIG. 12, the output of the memory 82 is directed to multi-bit digitizer software 84, which utilizes different threshold values to convert the data to a standard format of date which are placed in a memory 86, similar to the standard format of FIG. 10, which can be converted by a standard decoder algorithm to a bar code symbol.

Figure 13:
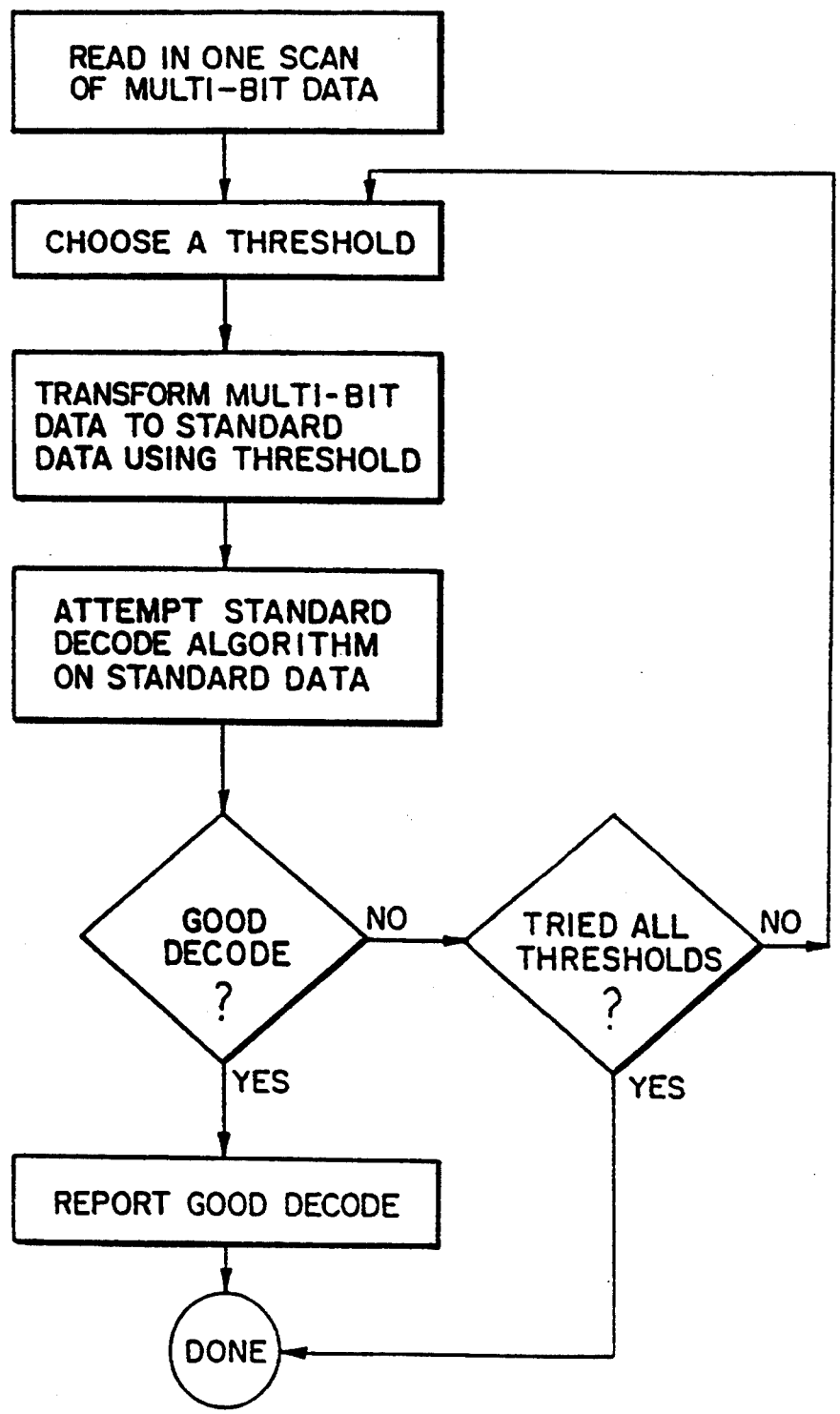
FIG. 13 is a logic flow diagram illustrating the operation of transform software for processing and converting the multi-bit data to a standard format so that a standard decoder algorithm can decode the data to a bar code, and also for modifying the threshold used during processing of the multi-bit memory data.

FIG. 13 is a logic flow diagram explaining transform software for processing and converting the multi-bit memory data to a standard format so that a standard decoder algorithm can decode the data to a bar code, and also illustrates a logic flow diagram of software for modifying the threshold used during processing of the multi-bit memory data. One scan of the multi-bit data in memory is read into the decoder which chooses a threshold value, and based thereon, transforms the multi-bit data to a standard data format. A standard decoder algorithm then decodes the standard data. If the result is a valid acceptable bar code pattern, a valid decode is reported and the sequence is finished. If the result is an invalid bar code pattern, the routine then proceeds through a sequence of alternative threshold values in different processing loops until a valid acceptable bar code pattern is reported.

It is also possible to change the threshold dynamically while decoding a single scan. For example, the standard decode algorithm can decode character by character until an invalid character is reached and then try different thresholds in that invalid character until a valid character is found.

Figure 14:
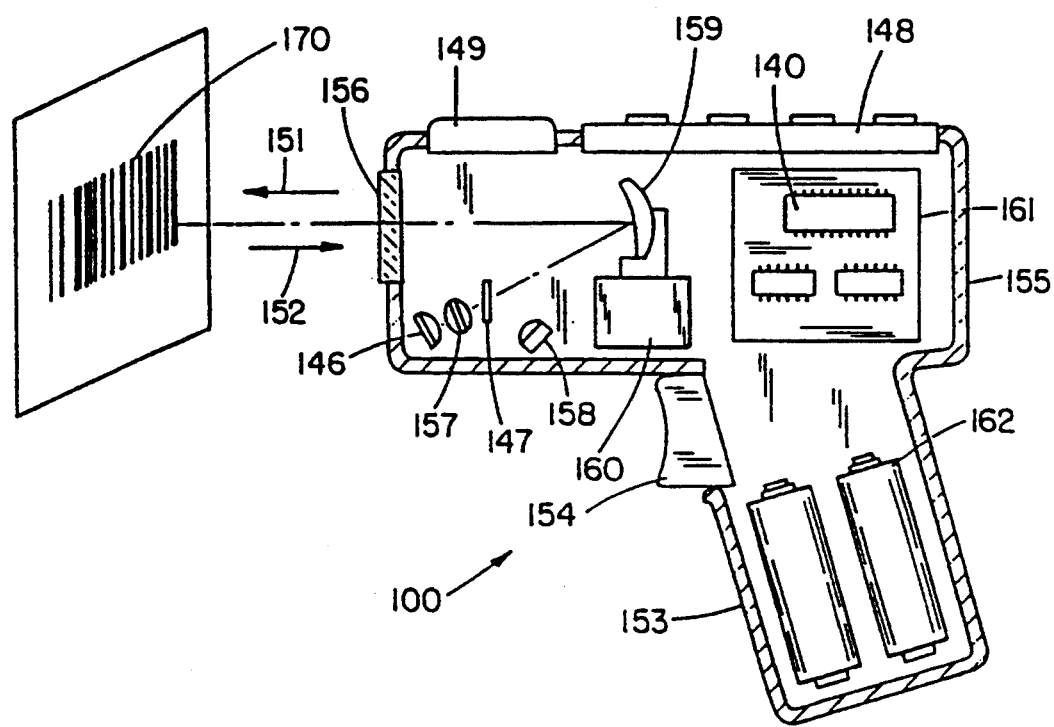
FIG. 14 illustrates a highly simplified embodiment of one type of bar code reader which can be utilized in association with the multiple bit digitizer circuit of the present invention.

FIG. 14 illustrates a highly simplified embodiment of one type of bar code reader that may be modified to utilize the multi-bit digitizer of the present invention. A reader 100 may be implemented in a hand-held scanner, as illustrated, or a desk-top workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 14 is generally of the style disclosed in U.S. Pat. No. 4,760,248 issued by Swartz et al, or in U.S. Pat. No. 4,896,026 assigned to Symbol Technologies Inc and also similar to the configuration of a bar code reader commercially available as part number LS 8100 or LS2000 from Symbol Technologies Inc. Alternatively, or in addition feature of U.S. Pat. No. 4,387,297 issued to Swartz et al or U.S. Pat. No. 4,409,470 issued to Shepard et al, both such patents assigned to Symbol Technologies Inc, may be employed in constructing the bar code reader unit of FIG. 15. These U.S. Pat. Nos. 4,760,248, 4,896,026, and 4,409,470 are incorporated herein by reference, but the general design of such devices will briefly described here for reference.

Referring to FIG. 14 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun shaped device having a pistol-grip type of handle 153. A movable trigger 154 is employed to allow the user to activate the light beam 151 and detector circuitry when the user has positioned the device to point at the symbol to be read. A lightweight plastic housing 155 contains the laser light source 146, the detector 158, the optics 157, 147, 159, and signal processing circuitry including a CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of handheld bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 14, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics sub-assembly mounted on a support, a scanning element such as a rotating or reciprocating mirror, and a photodetector component. Control of data lines associated with such components may be connected to an electrical connector mounted on the edge or external surface of the module to enable the module to be electrically connected to a mating connector associated with other elements of a data acquisition system.

An individual module may have specific scanning or decoding characteristics associated therewith, eg, operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

While several embodiments and variations of the present invention for a multi-bit digitizer are described in detail herein, it should be apparent that the disclosure and teachings of the present invention will suggest many alternative designs to those skilled in the art.

What is claimed is:

1. A digitizer for a bar code reader, comprising:
   a. sensor means for sensing light reflected from a bar code symbol and for producing an analog scan signal representative thereof;
   b. means for detecting positive and negative edges in the analog scan signal and for developing timing signals representative thereof; and
   c. decoder means, receiving said timing signals as input and arranged to determine, from said timing signals, the strengths of each detected edge in the analog scan signal and to perform multiple threshold processing on at least some individual analog scan signals by processing said analog scan signals a plurality of times at different detection threshold levels.

2. A digitizer as claimed in claim 1 including means for detecting whether each detected edge is a positive-going edge or a negative-going edge.

3. A digitizer as claimed in claim 2 wherein said means for detecting includes a differentiator and comparator means arranged to provide as output an edge direction signal which is fed as input to said decoder means.

4. A digitizer as claimed in claim 2 including a flip flop circuit positioned to receive as a first input the output of the comparator means, and as a latching input said timing signals, the output of the flip flop circuit being fed as input to the decoder means.

5. A digitizer as claimed in claim 1 in which the determination by the decoder means of the strength of each detected edge is effected by software.

6. A digitizer as claimed in claim 1 in which the timing signals comprise a series of pulses, each corresponding to an individual detected edge, the decoder being arranged to determine the strength of each edge according to the width of the corresponding pulse in the timing signals.

7. A digitizer as claimed in claim 6 in which the decoder determines the relative strengths of adjacent positive-going and negative-going pulses by calculating the ratio of the corresponding pulse widths in the timing signals.

8. A digitizer as claimed in claim 1 in which the decoder output is checked for validity, and if the detected bar code is not a valid bar code the decoder means attempts to decode the analog scan signal again based upon a different edge strength threshold value.

9. A portable hand-held scanner incorporating a digitizer as claimed in claim 1.

10. A bar code reader incorporating a digitizer as claimed in claim 1.

11. A method of reading a bar code symbol, the method comprising:
   a. sensing light reflected from a bar code symbol and producing an analog scan signal representative thereof;
   b. detecting positive and negative edges in the analog scan signal and developing timing signals representative thereof;
   c. determining, from said timing signals, the strengths of each detected edge in the analog scan signal; and performing multiple threshold processing on at least some individual analog scan signals by processing said analog scan signals a plurality of times at different detection threshold levels.

12. A method as claimed in claim 11 including determining whether each detected edge is a positive-going edge or a negative-going edge.

13. A method as claimed in claim 11 in which the timing signals comprise a series of pulses, each corresponding to an individual detected edge, the method including determining the strength of each edge according to the width of the corresponding pulse in the timing signals.

14. A method as claimed in claim 7 including determining the relative strengths of adjacent positive-going and negative-going pulses by calculating the ratio of the corresponding Pulse widths in the timing signals.

15. A method as claimed in claim 11 including the step of checking the decoded output for validity, and if the output is not representative of a valid bar code, decoding the analog signal again based upon a different edge strength threshold value.

* * * * *

UNITED STATES PATENT AND TRADEMARK OFFICE
CERTIFICATE OF CORRECTION

PATENT NO. : 5,449,893

DATED : September 12, 1995

INVENTOR(S) : Raj Bridgelall and David P. Goren

It is certified that error appears in the above-identified patent and that said Letters Patent is hereby corrected as shown below:

Column 6, line 56, "7" should be --γ--.

Signed and Sealed this

Twenty-sixth Day of December, 1995

Attest:

BRUCE LEHMAN

Attesting Officer     Commissioner of Patents and Trademarks